UNITED STATES PATENT OFFICE.

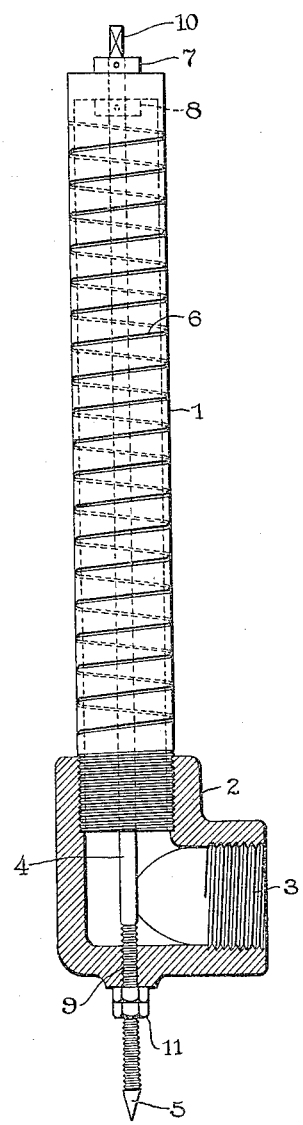

CARL C. THOMAS, OF BALTIMORE, MARYLAND.

FLUID-DISTRIBUTING DEVICE.

1,159,549.　　Specification of Letters Patent.　　Patented Nov. 9, 1915.

Application filed August 8, 1914. Serial No. 855,822.

*To all whom it may concern:*

Be it known that I, CARL C. THOMAS, a citizen of the United States, residing at Baltimore, in the State of Maryland, have invented new and useful Improvements in Fluid-Distributing Devices, of which the following is a full, clear, concise, and exact description, reference being had to the accompanying drawing, forming a part of this specification.

This invention relates to fluid distributing devices and more particularly to those for producing sprays.

It has among its objects to provide a device which may be readily adjusted to vary the character, amount, and range of the spray produced thereby.

Other objects and advantages of the invention will hereinafter appear.

The accompanying drawing illustrates in section one embodiment of the invention and the same will now be described.

The device includes a tubular member 1 threaded into a fitting 2 having an inlet port 3 in communication with the interior of said member 1. A spindle 4 passes through the tube 1 and fitting 2 providing a spike 5 or other support whereby the device may be fixed in the desired position.

The member 1 is closed at its upper end and is provided with a spiral slot 6 through which the fluid entering the same is discharged. The member 1 is of resilient material whereby it may be axially contracted and extended to vary the width of the slot 6 and the spindle 4 provides means for effecting contraction and extension of said member. The rod 4 has at its upper end two collars 7 and 8 abutting opposite sides of the end of the member 1 and has its lower end threaded through an opening 9 in the fitting 2. Thus if the spindle 4 be revolved in one direction, it will, through the medium of the collar 7, axially contact the member 1, while if revolved in the opposite direction, it will, through the medium of the collar 8, axially extend the member 1. For so operating the spindle 4 the same is provided with a squared end 10 and for locking said spindle after adjustment the same is provided with lock nuts 11.

As will be apparent when the fluid is admitted into the fitting it will enter the member 1, discharging in a spiral sheet or spray through the slot 6. Also, as will be readily apparent, the helical formation of the slot is particularly well adapted for adjustment as above described, and moreover provides for a large discharge area which, of course, is proportional to the pitch of the spiral. Furthermore, increasing the width of the slot 6 also provides for effectively flushing the interior of the tube, and the slot itself, in case sediment should collect therein and clog the openings.

It should, of course, be understood that various modifications may be made in the device illustrated without departing from the scope of the appended claims.

I am aware that heretofore spraying devices have been proposed, consisting of socalled "spiral" or, more properly, "helical" wire springs, *i. e.*, springs formed by rolling up round wire into the form of a helical spring; but obviously it is difficult to attach such a spring rigidly at one end to a fluid-supply fitting, or to close tightly and permanently the other end of such a spring. Soldered or brazed joints are not satisfactory as means for connecting a supply fitting or an end closure to such a spring, for the working of the spring incident to its expansion and contraction, tends to break such joints; also the heat of the soldering or brazing operation draws the temper of the portion of the spring member adjacent the point of brazing so that as a result the spring member tends to open more widely, near the point of brazing, than elsewhere. But by making the member 1 in the form of a tube, slit helically, these objections are overcome; for the helical slot may start a sufficient distance from one end of the tube, as shown in the drawing, to provide a circumferentially complete end portion which, being circumferentially complete, will not work with expansion or contraction of the slotted portion of the tube, and therefore may have a permanently tight joint, such for example as a threaded joint, with the supply fitting; and, similarly, the other end of the tube may be circumferentially complete, thereby making possible the closure of that end of the tube by an integral closure, such as shown in the drawing, or by any other suitable closure.

What I claim as new and desire to secure by Letters Patent is:

1. A device of the character set forth, comprising an integral tubular body of resilient material one end of which is circumferentially complete, said body being closed at its other end and provided with a helical slot intermediate its ends.

2. A device of the character set forth, comprising an integral tubular body of resilient material closed at one end and circumferentially complete at the other end and having a helical slot in the intermediate portion of such tube, such other end of the tube being screw threaded.

3. A device of the character set forth, comprising an integral tubular body of resilient material closed at one end and circumferentially complete at the other end and having a helical slot in the intermediate portion of such tube, such other end of the tube being screw threaded, and a flow fitting screw-connected to the threaded end of the said tube.

4. A device of the character set forth, comprising an integral tubular body of resilient material, one end of which is circumferentially complete, said body being closed at its other end and provided with a helical closed slot intermediate its ends, and means for effecting contraction of the body to vary the width of the slot therein.

5. A device of the character set forth, comprising an integral tubular body, of resilient material closed at one end and circumferentially complete at the other and having a helical slot in the intermediate portion of said tube, such other end of the tube being screw-threaded. a flow fitting screw connected to the threaded end of said tube. and means connecting the closed end of said body with said fitting for effecting contraction of said body to vary the width of the slot therein.

In witness whereof, I have hereunto subscribed my name in the presence of two witnesses.

CARL C. THOMAS.

Witnesses:
J. C. WILSON,
L. A. WATSON.

Copies of this patent may be obtained for five cents each, by addressing the "Commissioner of Patents, Washington, D. C."